(12) United States Patent
Gong et al.

(10) Patent No.: US 11,586,610 B2
(45) Date of Patent: Feb. 21, 2023

(54) METHOD, DEVICE, AND COMPUTER PROGRAM FOR STORING INDEX VALUES OF MONITORED OBJECTS

(71) Applicant: EMC IP Holding Company LLC, Hopkinton, MA (US)

(72) Inventors: Min Gong, Shanghai (CN); Yi Shang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 42 days.

(21) Appl. No.: 17/193,808

(22) Filed: Mar. 5, 2021

(65) Prior Publication Data

US 2022/0207017 A1    Jun. 30, 2022

(30) Foreign Application Priority Data

Dec. 31, 2020    (CN) .......................... 202011625408.X

(51) Int. Cl.
*G06F 16/23*    (2019.01)
*G06F 16/22*    (2019.01)
(Continued)

(52) U.S. Cl.
CPC ...... *G06F 16/2365* (2019.01); *G06F 16/2228* (2019.01); *G06F 16/95* (2019.01)

(58) Field of Classification Search
CPC ............ G06F 16/2365; G06F 16/2228; H04L 51/216; H04L 67/535
See application file for complete search history.

(56) References Cited

U.S. PATENT DOCUMENTS 6,282,570 B1 * 8/2001 Leung ................ G06F 11/3409
 709/224
2003/0093408 A1 * 5/2003 Brown ................ G06F 16/2272
(Continued)

FOREIGN PATENT DOCUMENTS

CN    111400368 A   *  7/2020
KR    20220016862 A  *  2/2022

OTHER PUBLICATIONS

S. Rawat and D. R. Patil, "Efficient focused crawling based on best first search," 2013 3rd IEEE International Advance Computing Conference (IACC), 2013, pp. 908-911, doi: 10.1109/IAdCC.2013.6514347. (Year: 2013).*

*Primary Examiner* — Dennis Truong
(74) *Attorney, Agent, or Firm* — Amin, Turocy & Watson, LLP

(57) ABSTRACT

Index values of monitored objects are stored. Sets of index values, collected at time points within a time period and each including a first number of index values corresponding to a respective monitored object, are received. For each set, a second number of index values is selected from the first number to generate sets of reduced index values for storage. The second number to be used for reduction of subsequent index values is updated at least once, the updating comprising: generating a first list of monitored objects based on the sets of index values, generating a second list of monitored objects based on the sets of reduced index values, and updating the second number based on a comparison between the first list and the second list. The amount of monitoring data stored is reduced while enabling accurate searching for top-ranked monitored objects.

20 Claims, 6 Drawing Sheets

(51) Int. Cl.
*G06F 16/95* (2019.01)
*G06F 16/215* (2019.01)

(56) References Cited

U.S. PATENT DOCUMENTS

| | | | | |
|---|---|---|---|---|
| 2004/0133395 | A1* | 7/2004 | Ding | H04L 67/535 |
| | | | | 702/182 |
| 2013/0254212 | A1* | 9/2013 | Rao | G06F 16/2264 |
| | | | | 707/746 |
| 2014/0006413 | A1* | 1/2014 | Gay | G06F 16/31 |
| | | | | 707/746 |
| 2014/0046906 | A1* | 2/2014 | Patiejunas | G06F 16/113 |
| | | | | 707/661 |
| 2014/0317734 | A1* | 10/2014 | Valencia | G06F 21/552 |
| | | | | 726/22 |
| 2015/0006634 | A1* | 1/2015 | Gong | G06Q 50/01 |
| | | | | 709/204 |
| 2015/0363404 | A1* | 12/2015 | Dickie | G06F 16/22 |
| | | | | 707/741 |
| 2017/0019492 | A1* | 1/2017 | Gong | H04L 67/535 |
| 2017/0220651 | A1* | 8/2017 | Mathew | G06F 16/248 |
| 2019/0155806 | A1* | 5/2019 | Mathew | G06F 16/285 |

* cited by examiner

| | 9:00 | 9:01 | 9:02 | 9:03 | 9:04 | 9:05 | 9:06 | 9:07 | 9:08 | 9:09 | 9:10 | 9:11 | 9:12 | ... | 10:00 |
|---|---|---|---|---|---|---|---|---|---|---|---|---|---|---|---|
| c-1 | 1.85 | 0.50 | 0.54 | 0.67 | 0.30 | 1.87 | 0.92 | 1.96 | 1.54 | 1.59 | 0.22 | 0.79 | 0.55 | | 1.91 |
| c-2 | 1.13 | 0.79 | 1.37 | 0.38 | 1.37 | 0.94 | 1.55 | 0.22 | 1.07 | 0.69 | 1.33 | 1.00 | 0.80 | | 1.03 |
| c-3 | 1.00 | 1.97 | 1.75 | 1.58 | 1.42 | 1.60 | 0.14 | 0.87 | 0.63 | 1.56 | 0.23 | 0.04 | 0.86 | | 0.79 |
| c-4 | 0.26 | 0.80 | 0.50 | 1.78 | 1.16 | 0.54 | 0.15 | 0.33 | 1.86 | 0.94 | 1.96 | 1.59 | 1.31 | | 1.18 |
| c-5 | 1.58 | 1.27 | 1.62 | 0.29 | 1.86 | 1.70 | 1.12 | 1.57 | 0.63 | 1.24 | 0.69 | 0.82 | 0.39 | | 0.67 |
| c-6 | 0.14 | 0.64 | 1.83 | 1.10 | 1.14 | 0.95 | 1.57 | 0.74 | 1.56 | 1.02 | 1.75 | 0.80 | 0.68 | | 0.12 |
| c-7 | 0.20 | 1.47 | 0.52 | 1.06 | 1.04 | 0.12 | 1.95 | 1.57 | 0.87 | 1.74 | 1.62 | 0.37 | 1.85 | | 1.51 |
| ... | | | | | | | | | | | | | | | |
| c-E | 1.21 | 0.68 | 1.56 | 1.13 | 0.94 | 0.29 | 0.85 | 0.39 | 1.38 | 1.83 | 0.82 | 0.68 | 0.91 | | 1.74 |

FIG. 1A

Time interval: 9:00 to 9:05

| Client terminal | Average |
|---|---|
| c-1 | 0.95 |
| c-2 | 1.00 |
| c-3 | 1.55 |
| c-4 | 0.84 |
| c-5 | 1.39 |
| c-6 | 0.97 |
| c-7 | 0.73 |
| ... | |
| c-E | 0.97 |

Time interval: 9:00 to 9:10

| Client terminal | Average |
|---|---|
| c-1 | 1.09 |
| c-2 | 0.99 |
| c-3 | 1.16 |
| c-4 | 0.93 |
| c-5 | 1.23 |
| c-6 | 1.13 |
| c-7 | 1.10 |
| ... | |
| c-E | 1.01 |

Time interval: 9:00 to 10:00

| Client terminal | Average |
|---|---|
| c-1 | 1.09 |
| c-2 | 0.98 |
| c-3 | 1.03 |
| c-4 | 1.03 |
| c-5 | 1.10 |
| c-6 | 1.00 |
| c-7 | 1.13 |
| ... | |
| c-E | 1.03 |

FIG. 1B

METHOD, DEVICE, AND COMPUTER PROGRAM FOR STORING INDEX VALUES OF MONITORED OBJECTS

RELATED APPLICATION

The present application claims the benefit of priority to Chinese Patent Application No. 202011625408.X, filed on Dec. 31, 2020, which application is hereby incorporated into the present application by reference herein in its entirety.

TECHNICAL FIELD

Embodiments of the present disclosure relate to the field of computers, and more particularly, to a method, an electronic device, a computer-readable storage medium, and a computer program product for storing index values of monitored objects.

BACKGROUND

A typical usage scenario for monitoring a large-scale storage system is to list several top-ranked monitored objects in accordance with some indexes or measurement. For example, in a monitoring scenario, it is necessary to list, for example, 30 client terminals with the highest latency, list, for example, 50 client terminals with the highest number of disk accesses per second, and so on. Since the distribution of various index values of the client terminals is unknown, it is necessary to store all data of all the client terminals in a monitoring database to accurately give corresponding rankings. This brings a challenge to the capacity of the database. Since the distribution of various index values of client terminals is unknown, it is necessary to store all data for all client terminals in the monitoring database to accurately give corresponding accurate rankings. This brings a challenge to the capacity of the database.

To reduce the amount of data in the database, some existing methods use deletion and downsampling, for example, deleting data stored for longer than a certain period of time (e.g., more than 30 days) or downsampling the data to a lower resolution (e.g., from data per minute to data per hour). However, as scales of clustering systems may grow rapidly, deletion and downsampling methods may not be able to meet user needs.

SUMMARY

The embodiments of the present disclosure provide a solution for efficiently storing monitoring data, which can significantly reduce storage space requirements required for storing monitoring data while guaranteeing the searching accuracy.

According to a first aspect of the present disclosure, a method for storing index values of monitored objects is provided, including: receiving multiple sets of index values collected at multiple time points within a time period, each set of index values including a first number of index values corresponding to a respective monitored object. The method further includes: selecting a second number of index values from the first number of index values for each set in the multiple sets of index values, the second number being less than the first number, to generate multiple sets of reduced index values for storage. The method further includes updating, by performing the following at least once, the second number to be used for reduction of subsequent index values: generating a first list of monitored objects based on at least a part of the multiple sets of index values; generating a second list of monitored objects based on at least a part of the multiple sets of reduced index values; and updating the second number based on a comparison between the first list and the second list.

According to a second aspect of the present disclosure, an electronic device is provided, including: at least one processing unit; and at least one memory coupled to the at least one processing unit and storing instructions for execution by the at least one processing unit, wherein the instructions, when executed by the at least one processing unit, cause the electronic device to perform actions. The actions include: receiving multiple sets of index values collected at multiple time points within a time period, each set of index values including a first number of index values corresponding to a respective monitored object. The actions further include: selecting a second number of index values from the first number of index values for each set in the multiple sets of index values, the second number being less than the first number, to generate multiple sets of reduced index values for storage. The actions further include updating, by performing the following at least once, the second number to be used for reduction of subsequent index values: generating a first list of monitored objects based on at least a part of the multiple sets of index values; generating a second list of monitored objects based on at least a part of the multiple sets of reduced index values; and updating the second number based on a comparison between the first list and the second list.

According to a third aspect of the present disclosure, a non-transient computer storage medium is provided, including machine-executable instructions that, when executed by a device, cause the device to perform the method of the first aspect of the present disclosure.

According to a fourth aspect of the present disclosure, a computer program product is provided, including machine-executable instructions that, when executed by a device, cause the device to perform the method of the first aspect of the present disclosure.

In this way, the amount of monitoring data stored into a database can be significantly reduced while satisfying accurate searching for top-ranked monitored objects in any time interval.

It should be understood that the Summary section is neither intended to identify key or essential features of the embodiments of the present disclosure, nor intended to limit the scope of the present disclosure. Other features of the present disclosure will become readily understandable from the following description.

BRIEF DESCRIPTION OF THE DRAWINGS

The above and other objectives, features, and advantages of the embodiments of the present disclosure will become more readily understandable through the following detailed description with reference to the accompanying drawings. In the accompanying drawings, a plurality of embodiments of the present disclosure will be illustrated by way of example and not limitation, where FIG. 1A illustrates raw data of example index values collected within a time period according to embodiments of the present disclosure.

FIG. 1B illustrates an average of example index values within a time interval that are obtained based on raw data according to embodiments of the present disclosure.

DETAILED DESCRIPTION

Figure 2:
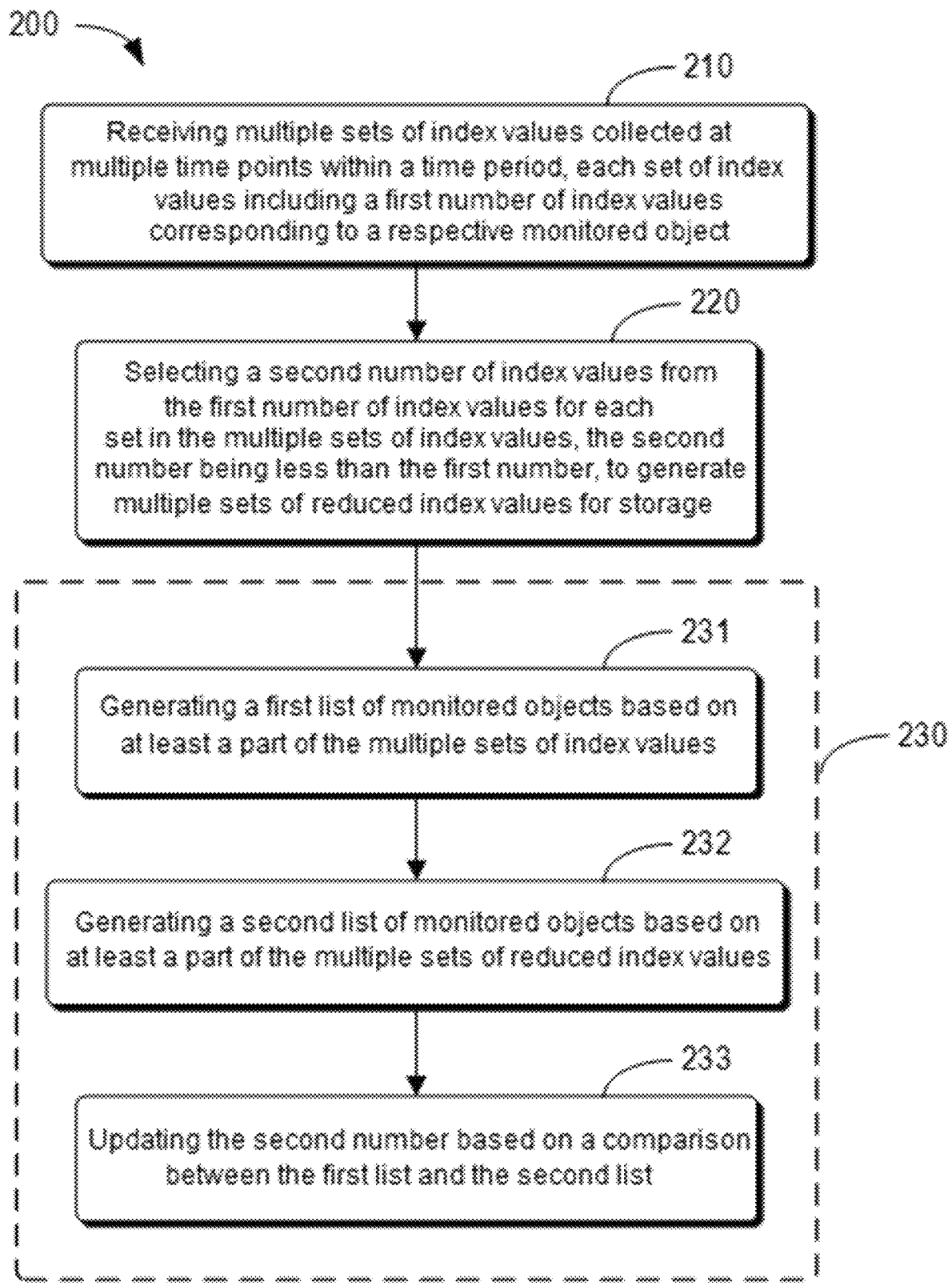
FIG. 2 illustrates a method for storing index values of monitored objects according to embodiments of the present disclosure.

The concept of the present disclosure will now be explained with reference to various example embodiments shown in the accompanying drawings. It should be understood that these embodiments are described only for the purpose of enabling a person skilled in the art to better understand and then implement the present disclosure, instead of limiting the scope of the present disclosure in any way. It should be noted that similar or identical reference signs may be used in the drawings where feasible, and similar or identical reference signs may indicate similar or identical elements. Those skilled in the art will understand that from the following description, alternative embodiments of the structures and/or methods described herein may be adopted without departing from the principles and concepts of the present disclosure described.

In the context of the present disclosure, the term "including" and its various variants may be understood as open-ended terms meaning "including but not limited to"; the term "based on" may be understood as "at least partially based on"; the term "an embodiment" may be understood as "at least one embodiment"; and the term "another embodiment" may be understood as "at least one other embodiment." Other terms that may appear but are not mentioned here, unless explicitly stated, should not be interpreted or limited in a manner that is contrary to the concept on which the embodiments of the present disclosure are based.

As described above, a typical usage scenario for monitoring a large-scale storage system is to list several top-ranked monitored objects in accordance with some indexes or measurement. For example, a user might use a searching that is "setting a time period and then listing 30 client terminals with the largest latency values among all client terminals." Such time period can be freely chosen, for example, "last 5 minutes," "last 30 minutes," "last one hour," and so on. Although the user only wants to view the top-ranked objects, it is necessary to maintain data for all objects to support this searching only. The reason for this is that different time period settings may result in different searching results for top-ranked objects.

As an example, reference is made to FIG. 1A, which illustrates raw data of example index values collected within a time period. As shown in FIG. 1A, the data has the form of a matrix, where each row indicates an individual client terminal (c-1, c-2, c-E) and each column indicates the latency values collected per minute from 9 o'clock to 10 o'clock. Suppose that a user wants to search for the client terminals with top-ranked 3 latency values in different time periods, where averages of the latency values are used for ranking. After setting the time periods, for an example where the user sets three time periods, 9:00-9:05, 9:00-9:10, and 9:00-10:00, based on the raw data shown in FIG. 1A, the average of the latency values of each client terminal in these three time periods is calculated, as shown in FIG. 1B.

FIG. 1B illustrates an average of example index values within a time interval that are obtained based on raw data. The left part of FIG. 1B illustrates the average latency value of each client terminal in the time interval 9:00-9:05, where the shaded client terminals c-2, c-3, and c-5 are the top-ranked three client terminals. The middle part of FIG. 1B illustrates the average latency value of each client terminal in the time interval 9:00-9:10, where the shaded client terminals c-3, c-5, and c-6 are the top-ranked three client terminals. The right part of FIG. 1B illustrates the average latency value of each client terminal in the time interval 9:00-10:00, where the shaded client terminals c-1, c-5, and c-7 are the top-ranked three client terminals. It can be seen that the top-ranked three client terminals are different for different time intervals.

The embodiments of the present disclosure propose a solution that can be referred to as dynamic filtering, which can significantly reduce the amount of data stored into a storage database while satisfying accurate searching for the top-ranked monitored objects in any time interval. Unlike deletion and downsampling solutions in the prior art that reduce the amount of data after data has already been stored into a database, the solution proposed in the present disclosure filters data to be stored in a database before the data is written to the database to reduce the amount of data written to the database.

Herein, the index values for monitoring storage clusters are not limited to latency values, but may also include, for example, inputs/outputs per second, average response time, transactions per second, traffic, and so on. In addition, the time point herein does not necessarily mean that an instantaneous index value is collected at a certain specific time, but can also mean that index values are obtained within a time range.

Several example implementations of the present disclosure are described in detail below. For example purposes, some specific environments, systems, configurations, values, etc. may be covered in the description of embodiments. It should be understood that these are merely examples and that the scope of the present disclosure is not limited to the example implementations described.

Figure 3:
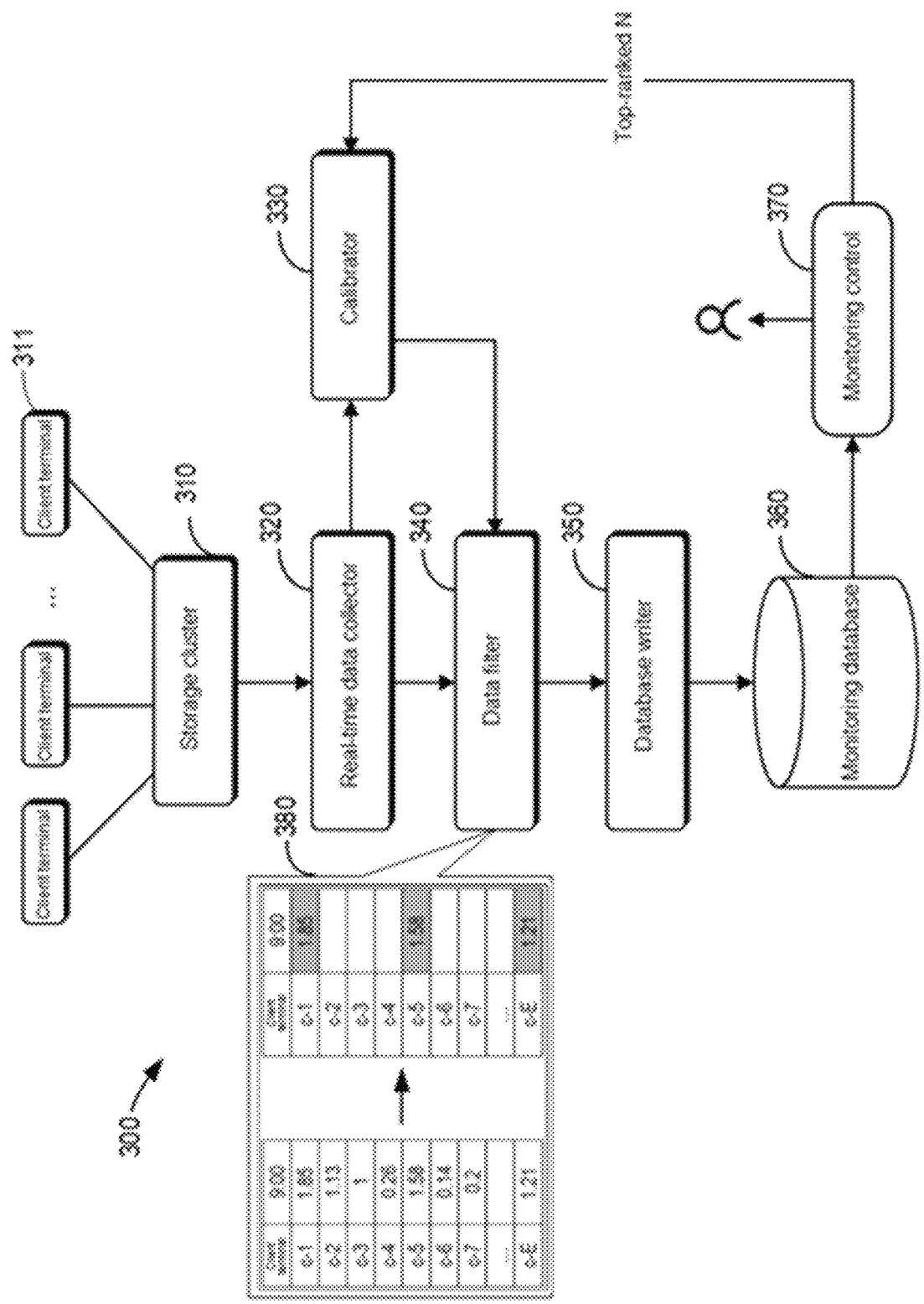
FIG. 3 illustrates an example system in which a method for storing index values of monitored objects according to embodiments of the present disclosure can be implemented.

A method for storing index values of monitored objects according to embodiments of the present disclosure is described below with reference to FIGS. 2 and 3. FIG. 2 illustrates method 200 for storing index values of monitored objects according to embodiments of the present disclosure. FIG. 3 illustrates an example system in which a method for storing index values of monitored objects according to embodiments of the present disclosure can be implemented.

As shown in FIG. 2, at block 210, multiple sets of index values collected at multiple time points within a time period are received. Each set of index values include a first number of index values corresponding to a respective monitored object. In some embodiments, the monitored objects may be multiple client terminals 311 connected to storage cluster 310 shown in FIG. 3. Storage cluster 310 may be a parallel or distributed storage cluster consisting of multiple nodes interconnected via a network. Each node constitutes a unit of storage cluster system 310, and each node can support thousands of or even more client terminals 311. Client terminals 311 can back up their data to storage cluster 310 via the network.

When storage cluster 310 has a first number of online client terminals, respective index values thereof, such as but not limited to, protocol latency values, I/Os per second, average response time, transactions per second, and traffic, can be collected from these client terminals 311 in real time. In some embodiments, the multiple sets of index values collected at the multiple time points within the time period may be received by real-time data collector 320 shown in FIG. 3 from storage cluster 310. For example, real-time data collector 320 can receive, within a time period, respective index values related to client terminals 311 from storage cluster 310 at multiple time points within the time period at regular intervals (e.g., every minute, every 5 minutes, every half hour, etc.), depending on the settings.

In some embodiments, real-time data collector 320 can send requests to storage cluster 310 at these time points for the associated index values and receive, as a response, multiple sets of index values. Alternatively or additionally, storage cluster 310 can push these index values to real-time data collector 320 at these time points.

In some embodiments, the multiple time points used to collect the index values may be evenly distributed (for example but not limited to every minute, every 5 minutes, or every half hour) over a time period. The index values evenly distributed over time can more accurately reflect the working status of client terminals 311, so that the user can obtain useful analysis results.

The index values from storage cluster 310 can be organized as a set of ranked index values, where each index value corresponds to an index value of a single client terminal. By way of example only, if the current storage cluster 310 has 1000 client terminals online, real-time data collector 320 can collect multiple sets of index values with a dimension of 1000 at multiple time points. The index values received from storage cluster 310 are also referred to as raw data. The raw data received by real-time data collector 320 can be transmitted to calibrator 330 and data filter 340 as shown in FIG. 3. In some embodiments, the multiple sets of index values can be saved and transmitted in the form of a matrix, where the rows correspond to client terminals 311 and the columns correspond to specific time points when collection actions occurred.

At block 220, a second number of index values are selected from the first number of index values for each set in the multiple sets of index values, the second number being less than the first number, to generate multiple sets of reduced index values for storage. In other words, the number of index values in each set of index values is reduced from the first number to the second number, causing the storage capacity required to store them to be reduced.

In some embodiments, the second number of index values can be selected from the first number of index values by data filter 340 shown in FIG. 3. Specifically, data filter 340 can be configured with a filtering value and use that filtering value to select the second number of index values from the first number of index values. According to embodiments of the present disclosure, the filtering value is dynamically configured by calibrator 330. Calibrator 330 can generate calibrated filtering values at regular or irregular intervals and send them to data filter 340 for use by data filter 340 to filter the received index values in the next time period.

In some embodiments, the filtering value may be an integer and directly used as the second number, in which case the filtering value and the second number can be used interchangeably. Alternatively, the filtering value may be a number in the range of 0 to 1 as a ratio of the second number to the first number, in which case data filter 340 can multiply the filtering value and the first number and, if desired, round up or down to obtain the second number. It should be noted that, compared to the raw data, some elements in the matrix of the reduced index values are empty, that is, more sparse, as described from the matrix perspective, thus saving the storage space required for storing the index values into monitoring database 360.

In some embodiments, data filter 340 can rank the first number of index values and select the second number of index values ranked top among the ranked index values. In the scenario where the user searches for several top-ranked monitored objects in a time interval, this approach allows the reduced index values stored into monitoring database 360 to better match such searching. In some embodiments, the index values may be ranked from large to small or from small to large, depending on the type of index values. For example, for latency values, the user usually pays more attention to client terminals 311 with high latency values to find potential or already occurred failures.

By way of example only, for example, in a case where storage cluster 310 has 1000 client terminals online, a set of index values may include up to 1000 latency values, and at this time, data filter 340 can rank the 1000 latency values from large to small and select a second number (e.g., 100) of latency values from the ranked latency values for storage to monitoring database 360. Referring to FIG. 3, in a simplified example 380 shown only to facilitate understanding, data filter 340 receives a set of latency values at time point 9:00 with respect to client terminals c-1 to c-E and then ranks them, and when the second number is 3, selects and retains data of client terminals c-1, c-5, and c-E with the largest latency values.

As described above, multiple sets of reduced index values are generated by data filter 340. Referring to FIG. 3, the multiple sets of reduced index values can be transmitted to database writer 350 in the form of a sparser matrix. Database writer 350 can store the multiple sets of reduced index values received from data filter 340 into monitoring database 360 in real time, at regular intervals, or based on events, thereby achieving a reduction in the amount of data stored into monitoring database 360.

After the multiple sets of reduced index values are stored in monitoring database 360, the user can access the monitoring database to search for monitored objects of interest in a certain time interval. As shown in FIG. 3, system 300 also includes monitoring control 370, and the user can use monitoring control 370 to access monitoring database 360, for example, to search for top-ranked N monitored objects in a certain time interval. By way of example only, N=30, which is usually much smaller than the total number of monitored objects (e.g., compared to the 1000 online client terminals). Monitoring database 360 stores the multiple sets of reduced index values, and the resulting searching results might differ from those generated by the raw data. Accuracy is taken into consideration herein to evaluate data filter 340. In some embodiments, the user can also transmit to calibrator 330, with the aid of monitoring control 370, the number N of the monitored objects that the user is interested in, for use in calibrating the filtering value, as described below.

According to the embodiments of the present disclosure, when the data distribution of the index values changes or the user's searching requirements change, the second number may not meet the accuracy requirements, that is, the searching results generated based on the reduced index values are significantly different from the searching results generated based on the raw data. In this case, the second number can be dynamically updated by calibrator 330 to keep the accuracy of the searching results within an acceptable range, as described in detail below.

Returning to FIG. 2, block 230 is executed at least once to update the second number to be used for reduction of subsequent index values. Specifically, at block 231, a first list of monitored objects is generated based on at least a part of the multiple sets of index values. At block 232, a second list of monitored objects are generated based on at least a part of the multiple sets of reduced index values. At block 433, the second number is updated based on a comparison between the first list and the second list. In other words, the degree of reduction of raw data can be dynamically adjusted to meet the requirements of accuracy of searching results and reduction of storage volume at the same time. Here, the first list is generated based on the raw data and acts as the ground truth; and the second list is generated based on the reduced data and will be compared with the first list. The result of comparison can be used to update the second number.

The actions described above with reference to block 230 can be performed by calibrator 330 shown in FIG. 3 to dynamically calibrate or update the filtering value. Calibrator 330 can dynamically update the filtering value and transmit the updated filtering value to data filter 340, whereby data filter 340 can obtain the second number that is used to filter multiple sets of index values received in a subsequent time period.

Figure 4:
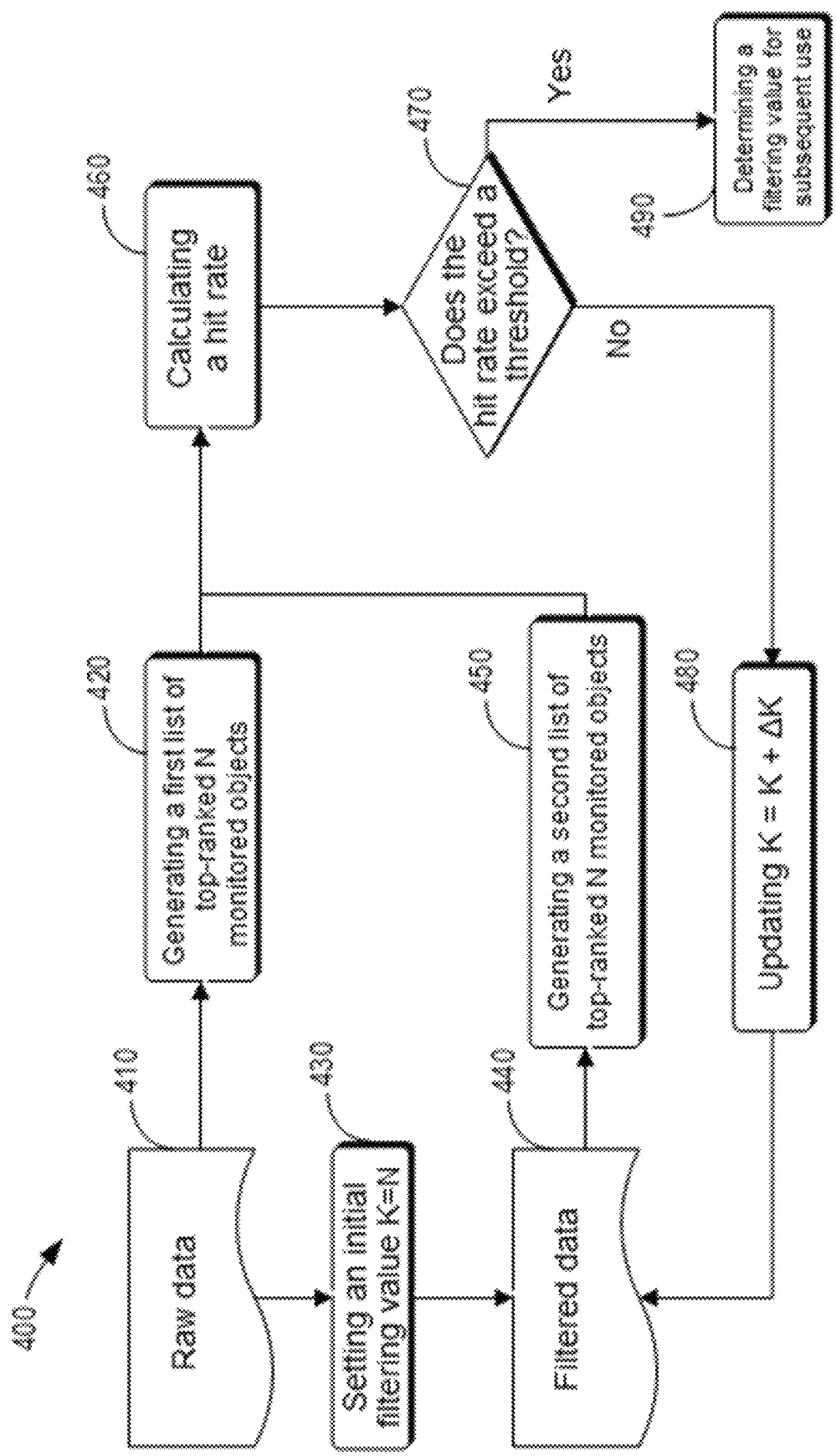
FIG. 4 illustrates a schematic diagram of a process of dynamically calibrating a filtering value according to embodiments of the present disclosure.

FIG. 4 illustrates a schematic diagram of dynamically calibrating a filtering value according to some embodiments of the present disclosure. The process described with reference to FIG. 4 can be considered as a specific implementation of block 230 and can be performed by calibrator 330. A cache (not shown in the figure) may be included within calibrator 330 for storing raw data 410 received from real-time data collector 320 within a time period. Raw data 410 can be stored in the cache in the form of a matrix, wherein the rows of the matrix represent monitored objects and the columns of the matrix represent each time point at which data is collected within the time period. For example, by way of example only, if the monitored objects are 1000 client terminals, the time period is 1 hour, and the latency values of the client terminals are collected every one minute, the matrix of raw data stored in the cache includes 1000 rows and 60 columns of latency values. It should be understood that the length of the time period associated with the raw data in the storage cache is configurable, e.g., half an hour, 10 minutes, 5 minutes, etc.; and the number or interval of time points within each time period is also configurable, e.g., every 30 seconds, 1 minute, 5 minutes, 10 minutes, etc., without limitation to the above examples.

At block 420, calibrator 330 can generate a list of top-ranked N monitored objects based on the raw data. In some embodiments, for a time interval, the raw data for that time interval, i.e., index values of the corresponding column of the raw data matrix, are used to generate a first list of monitored objects. This first list of monitored objects can be regarded as the ground truth. By way of example only, for an entire time period (e.g., one hour) in the cache, the raw data is used to calculate the average latency value for each of the client terminals, and ranking is performed to get a list of top-ranked (e.g., top 30) client terminals over the entire time period. Alternatively or additionally, for a portion of the time interval in the cache, the first list of monitored objects within that time interval can be generated using the corresponding portion of the raw data.

At block 430, calibrator 330 can set an initial filtering value K=N. Here, N may be the number of monitored objects that the user is interested in and are received from, for example, monitoring control 370 shown in FIG. 3. Then, at block 440, the filtering value is used to generate filtered data. Here, similar to data filter 340 described above, calibrator 330 can select and retain the top-ranked K index values from a set of index values of the raw data, thereby generating the filtered data. In other words, a column of index values in the raw data matrix is ranked, and the top-ranked K index values are selected and retained.

At block 450, calibrator 330 can generate a second list of top-ranked N monitored objects based on the filtered data. It should be understood that the filtered data used to generate the second list of monitored objects should correspond to the raw data used to generate the first list of monitored objects as the ground truth. Similar to block 420, by way of example only, for an entire time period (e.g., one hour) in the cache, the filtered data is used to calculate the average latency value for each of the client terminals, and ranking is performed to get a list of top-ranked (e.g., top 30) client terminals over the entire time period. Alternatively or additionally, for a portion of the time interval in the cache, a list of monitored objects within that time interval can be generated using the corresponding portion of the filtered data. It should be noted that, compared to the raw data, some elements of the filtered data are empty, that is, more sparse, as described from the matrix perspective. At this time, non-empty elements should be considered when generating the second list of monitored objects. By way of example only, certain client terminal has 60 latency values (e.g., every minute in an hour) in the raw data, but after filtering, only 10 may exist, and in this case, only these 10 latency values are used when calculating the average latency value for that client terminal.

At block 460, calibrator 330 can calculate a hit rate. According to the embodiments of the present disclosure, the hit rate is the accuracy of the list of monitored objects generated from the filtered data compared to the ground truth. Therefore, it is possible to count the number of monitored objects generated from the filtered data that hit the ground truth and calculate the hit rate.

In some embodiments, calibrator 330 can determine a proportion of monitored objects identical in the first list and the second list in the monitored objects in the second list; and determine, based on the proportion, the second number to be used for reduction of subsequent index values. In other words, when a monitored object in the second list also appears in the first list, the hit monitored object is correct, so the proportion can be used as the accuracy of the list generated from the reduced index values. For example, by way of example only, in the case where the searching that the user is interested in is to list the top 30 client terminals, if 18 of the 30 monitored objects in the list of monitored objects generated from the filtered data appear in the corresponding ground truth, the hit rate can be calculated as 60%

At block 470, calibrator 330 can determine whether the hit rate is higher than a threshold. By way of example only, the threshold may be an acceptable accuracy, e.g., 85%, 90%, 95%, etc., without limitation. If the hit rate exceeds the threshold, it indicates that the current filtering value or the corresponding second number is acceptable, and then at block 490, the current filtering value is determined as the filtering value for subsequent use. For example, filtering values that satisfy the threshold can be sent to data filter 340, which will filter data in the next time period.

If the hit rate is lower than the threshold, the process proceeds to block 480 to update the filtering value. For example, the filtering value can be incremented by a preset amount (K=K+ΔK). By trying larger filtering values and repeating the above blocks 440, 450, 460, and 470 in an iterative manner, the hit rate can be increased until the hit rate. According to embodiments of the present disclosure, the filtering value can be incremented in an iterative manner until the hit rate exceeds the threshold. By way of example only, the preset amount may be any integer, such as 1, 2, 3, etc., without limitation.

In other words, if the proportion of monitored objects in the second list hitting the first list is lower than the threshold, calibrator 330 needs to perform the following steps at least once until the proportion exceeds the threshold: updating the filtering value or second number by incrementing the same by the preset amount; regenerating the multiple sets of reduced index values using the updated filtering value or second number; and redetermining the proportion based on the regenerated multiple sets of reduced index values.

In addition, at block 490, calibrator 330 can determine the current filtering value as the filtering value for subsequent use. For example, filtering values that satisfy the threshold can be sent to data filter 340, which will filter data in the next time period.

It can be seen that by the process described above with reference to FIG. 4, data that have undergone different levels of filtering can be continuously tried to dynamically generate filtering values that satisfy the accuracy requirements, thus ensuring the accuracy of the list of monitored objects generated from the subsequent reduced index values.

The above has described the process in which calibrator 330 calibrates the filtering value for a single time interval; and calibrator 330 can also calibrate the filtering values for multiple different time intervals. In some embodiments, the columns in the raw data used in the calibration process may be configurable, i.e., calibrator 330 does not have to use all of the data in the buffer to calibrate the filtering value and may use only raw data of a portion of the time interval. For example, by way of example only, the latency values for columns 1 to 5 (the first 5 minutes), columns 1-10 (the first 10 minutes), columns 56-60 (the last 5 minutes), and minutes 51-60 (the last 10 minutes) are used without limitation. Further, calibrator 330 can perform calibration multiple times for different time intervals to obtain multiple calibrated filtering values, and then determine, based on the multiple calibrated filtering values, the filtering values to be transmitted to data filter 340 for subsequent filtering. In some embodiments, the maximum of the multiple calibrated filtering values can be transmitted to data filter 340. Alternatively, the average of the multiple calibrated filtering values can be transmitted to data filter 340.

In some embodiments, the second number can be updated respectively for different time intervals in the time period of the buffer of calibrator 330 based on corresponding portions of the multiple sets of index values and corresponding portions of the multiple sets of reduced index values to obtain multiple alternative second numbers; and the second number can be updated using an average or a maximum value of the multiple alternative second numbers. Thus, it is possible to provide optimized values of the second number for different time intervals.

Figure 5:
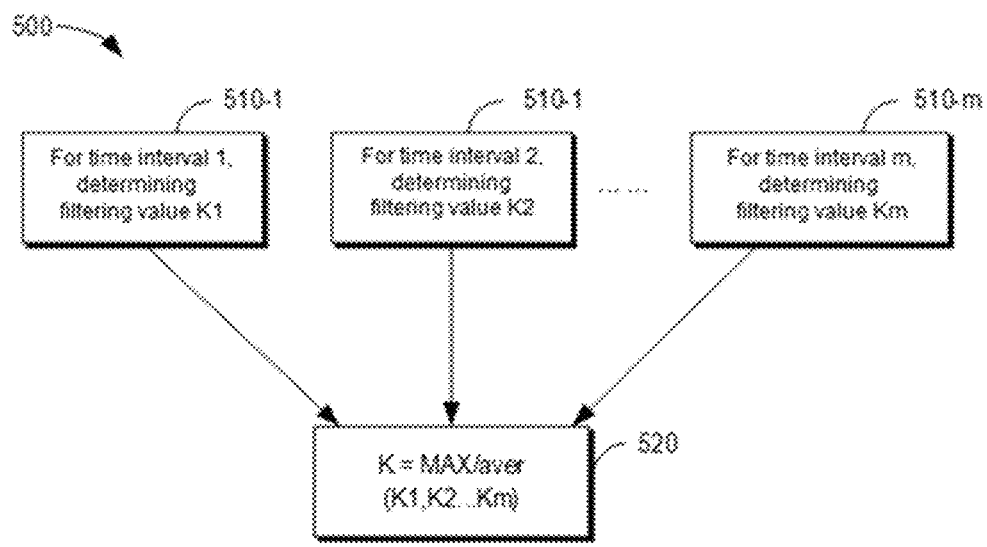
FIG. 5 illustrates a schematic diagram of process 500 of dynamically calibrating filtering values for different time intervals.

Such an embodiment is described in detail below with reference to FIG. 5. FIG. 5 illustrates a schematic diagram of method 500 of dynamically calibrating filtering values for different time intervals. Method 500 may be implemented by calibrator 330. Since the time interval for the user's searching may be arbitrary, for example, by way of example only, a short time interval may be 5 minutes or 10 minutes, and a long time interval may be 1 day, a week, or even longer. Therefore, different time intervals need to be taken into consideration to calibrate the filtering value.

Method 500 includes: determining multiple calibrated filtering values for multiple different time intervals (time intervals 1, 2, . . . m), respectively. In some embodiments, time intervals 1 to m may be time intervals of different lengths, for example, by way of example only, time interval 1 may be 5 minutes in length, time interval 2 may be 10 minutes in length, time interval 3 may be 30 minutes, and so on.

At block 510-1, for time interval 1, calibrator 330 can use raw data within time interval 1 in its buffer (e.g., for a 1-hour cache, 12 time intervals 1 of 5 minutes in length are included) and the corresponding filtered data to calibrate the filtering value to obtain K1. At this moment, K1 can be the average, the maximum, or any combination of all the calibrated filtering values for the 12 time intervals. Similarly, at block 510-2, for time interval 2, calibrator 330 can use raw data within time interval 2 in its buffer (e.g., for a 1-hour cache, 6 time intervals 2 of 10 minutes in length are included) and the corresponding filtered data to calibrate the filtering value to obtain K2. At this moment, K2 can be the average, the maximum, or any combination of all the calibrated filtering values for the 6 time intervals. By analogy, the celebrated filtering values K, K1, K2, . . . , and Km are obtained for time intervals of different lengths.

Then, at block 520, the average or maximum of the filtering values (K1, K2, . . . , and Km) for time intervals of different lengths is determined as the filtering value K for the reduction of the subsequent time period and sent to data filter 340 such as the one shown in FIG. 3. Thus, it is possible to provide optimized values for any different time intervals.

As can be seen from the above, the method for storing index values of monitored objects according to embodiments of the present disclosure can significantly reduce the amount of data stored into the database while satisfying accurate searching for the top-ranked monitored objects in any time interval.

Figure 6:
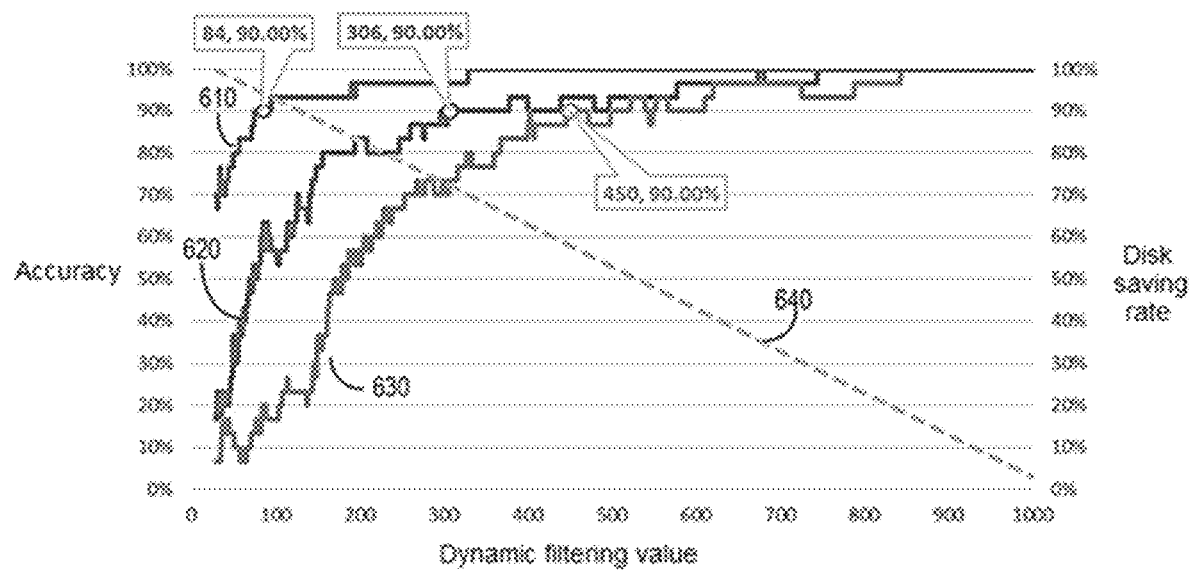
FIG. 6 illustrates a graph of disk saving rate and accuracy under different data distributions according to embodiments of the present disclosure.

FIG. 6 illustrates a graph of disk saving rate and accuracy under different data distributions according to the embodiments of the present disclosure. The horizontal axis in FIG. 6 indicates the range of dynamically filtered values, and the vertical axes on both sides indicate the accuracy and disk saving rate, respectively, where the number of client terminals is assumed to be 1000.

FIG. 6 illustrates test results showing three different types of data distributions, where curve 610 indicates a normal distribution with large standard deviations, curve 620 indicates a normal distribution with small standard deviations, and curve 630 indicates a Poisson distribution ($\lambda=10$). It can be seen that for curve 610, when the accuracy requirement is 90%, the filtering value is at least 84, that is, only 84 index values need to be stored among 1000 index values. Correspondingly, the disk saving rate is 91.6%. For curve 620, when the accuracy requirement is 90%, the filtering value is at least 306, that is, only 306 index values need to be stored among 1000 index values. Correspondingly, the disk saving rate is 69.4%. For curve 630, when the accuracy requirement is 90%, the filtering value is at least 450, that is, only 450 index values need to be stored among 1000 index values. Correspondingly, the disk saving rate is 55%. Thus, the technique provided in the present disclosure is particularly suitable for index values with large deviations of data distribution. Since the embodiments of the present disclosure can dynamically calibrate the filtering values over time, it is possible to adjust the scale of filtering in a timely manner when the data distribution of index values changes, thus obtaining the best balance between the disk saving rate and data accuracy.

Figure 7:
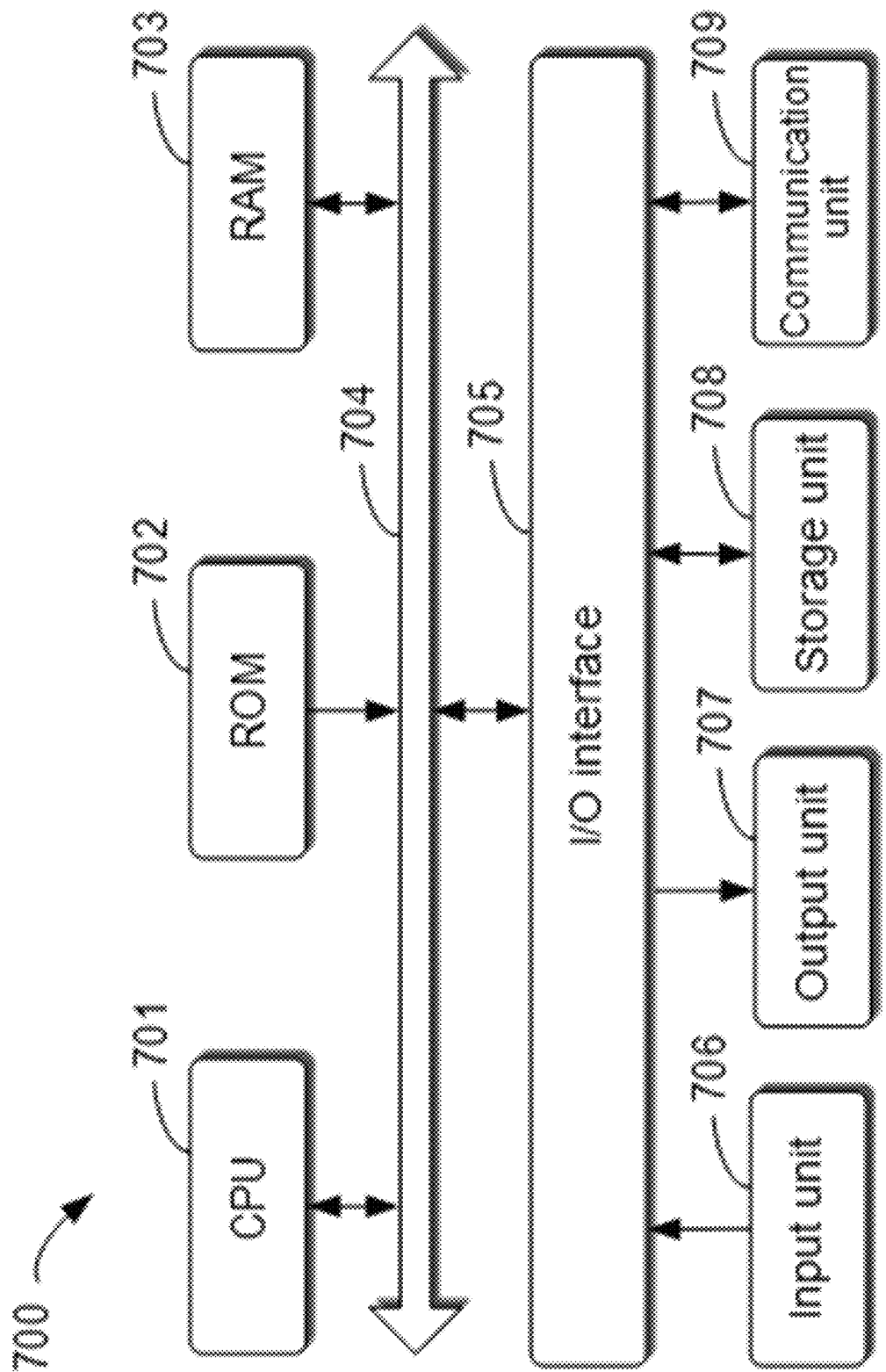
FIG. 7 illustrates a schematic block diagram of a device that can be used to implement the embodiments of the present disclosure.

FIG. 7 illustrates a schematic block diagram of device 700 that can be used to implement the embodiments of the present disclosure. As shown in the figure, device 700 includes central processing unit (CPU) 701 that may perform various appropriate actions and processing according to computer program instructions stored in read-only memory (ROM) 702 or computer program instructions loaded from storage unit 708 into random access memory (RAM) 703. In RAM 703, various programs and data required for the operation of storage device 700 may also be stored. CPU 701, ROM 702, and RAM 703 are connected to each other through bus 704. Input/output (I/O) interface 705 is also connected to bus 704.

Multiple components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices via a computer network such as the Internet and/or various telecommunication networks.

The methods or processes described above may be executed by processing unit 701. For example, in some embodiments, the method may be implemented as a computer software program that is tangibly included in a machine-readable medium, such as storage unit 708. In some embodiments, part or all of the computer program may be loaded and/or installed on device 700 via ROM 702 and/or communication unit 709. When the computer program is loaded into RAM 703 and executed by CPU 701, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the devices, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It also should be noted that each block in the block diagrams and/or flowcharts and a combination of blocks in the block diagrams and/or flowcharts may be implemented using a dedicated hardware-based system for executing specified functions or actions, or may be implemented using a combination of dedicated hardware and computer instructions.

Various embodiments of the present disclosure have been described above. The foregoing description is illustrative rather than exhaustive, and is not limited to the disclosed embodiments. Multiple modifications and variations will be apparent to those skilled in the art without departing from the scope and spirit of the illustrated various embodiments. The selection of terms used herein is intended to best explain the principles and practical applications of the embodiments or technical improvements to technologies in the market, or to enable other persons of ordinary skill in the art to understand the embodiments disclosed herein.

What is claimed is:

1. A method, comprising:
   receiving, by a system comprising a processor, multiple sets of index values collected at multiple time points within a time period, each set of index values of the multiple sets of index values comprising a first number of index values corresponding to a respective monitored object;
   selecting a second number of index values from the first number of index values for each set in the multiple sets of index values, the second number being less than the first number, to generate multiple sets of reduced index values for storage; and
   updating the second number to be used for reduction of subsequent index values based on a defined threshold percentage of matching entries, the updating being performed at least once and comprising:
      generating a first list of monitored objects based on at least a part of the multiple sets of index values;
      generating a second list of monitored objects based on at least a part of the multiple sets of reduced index values; and
      updating the second number based on determining whether a proportion of monitored objects, identical in the first list and the second list to the monitored objects in the second list, satisfies the defined threshold percentage of matching entries.

2. The method of claim 1, wherein the multiple time points are evenly distributed within the time period.

3. The method of claim 1, wherein selecting the second number of index values from the first number of index values in each set of index values comprises:
   ranking the first number of index values to produce ranked index values; and
   selecting the second number of index values that are ranked top among the ranked index values.

4. The method of claim 1, further comprising:
   in response to the proportion being determined to be lower than the defined threshold percentage of matching entries, performing operations at least once until the proportion exceeds the threshold, the operations comprising:
      updating the second number by incrementing the second number by a defined amount, resulting in an updated second number;
      regenerating the multiple sets of reduced index values using the updated second number, resulting in regenerated multiple sets of reduced index values; and
      redetermining the proportion based on the regenerated multiple sets of reduced index values; and
      determining the updated second number that satisfies the proportion exceeding the defined threshold percentage of matching entries as the second number to be used for reduction of subsequent index values.

5. The method of claim 1, further comprising:
   updating the second number respectively for different time intervals in the time period based on corresponding portions of the multiple sets of index values and corresponding portions of the multiple sets of reduced index values to obtain multiple alternative second numbers; and
   updating the second number using an average or a maximum value of the multiple alternative second numbers.

6. The method of claim 1, further comprising:
   identifying a first subset of monitored objects in the first list that satisfies a predefined number of top ranked objects according to a criterion; and
   identifying a second subset of monitored objects in the first list that satisfies a predefined number of top ranked objects according to the criterion,
   wherein determining whether the proportion of the monitored objects satisfies the defined threshold percentage of matching entries comprises,
      determining whether the proportion of the monitored objects, identical in the first subset and the second subset to the monitored objects in the second subset, satisfies the defined threshold percentage of matching entries.

7. An electronic device, comprising:
   at least one processing unit; and
   at least one memory coupled to the at least one processing unit and storing instructions for execution by the at least one processing unit, wherein the instructions, when executed by the at least one processing unit, cause the electronic device to perform operations comprising:
      receiving multiple sets of index values collected at multiple time points within a time period, each set of index values of the multiple sets of index values comprising a first number of index values corresponding to a respective monitored object;
      selecting a second number of index values from the first number of index values for each set in the multiple sets of index values, the second number being less than the first number, to generate multiple sets of reduced index values for storage; and
      updating, by performing at least the following operations at least once, the second number to be used for reduction of subsequent index values:

generating a first list of monitored objects based on at least a part of the multiple sets of index values;

generating a second list of monitored objects based on at least a part of the multiple sets of reduced index values;

updating the second number based on determining whether a proportion of monitored objects, identical in the first list and the second list to the monitored objects in the second list, satisfies a defined threshold percentage of matching entries; and regenerating the multiple sets of reduced index values.

8. The electronic device of claim 7, wherein the multiple time points are evenly distributed within the time period.

9. The electronic device of claim 7, wherein selecting the second number of index values from the first number of index values in each set of index values comprises:

ranking the first number of index values to produce ranked index values; and selecting the second number of index values that are ranked at least a threshold rank among the ranked index values.

10. The electronic device of claim 7, wherein the operations further comprise:

if the proportion is lower than the defined threshold percentage of matching entries, performing at least the following operations at least once until the proportion exceeds the defined threshold percentage of matching entries:

incrementing the second number by a preset amount, resulting in an incremented second number;

regenerating the multiple sets of reduced index values using the incremented second number, resulting in regenerated multiple sets of reduced index values; and redetermining the proportion based on the regenerated multiple sets of reduced index values.

11. The electronic device of claim 7, wherein the operations further comprise:

updating the second number respectively for different time intervals in the time period based on corresponding portions of the multiple sets of index values and corresponding portions of the multiple sets of reduced index values to obtain multiple alternative second numbers; and updating the second number using an average of the multiple alternative second numbers.

12. The electronic device of claim 7, wherein the operations further comprise:

identifying a first sub-list of monitored objects in the first list that satisfies a predefined number of top ranked objects according to a ranking criterion;

identifying a second sub-list of monitored objects in the first list that satisfies a predefined number of top ranked objects according to the ranking criterion; and wherein determining whether the proportion of the monitored objects, identical in the first list and the second list to the monitored objects in the second list, satisfies the defined threshold percentage of matching entries comprises, determining whether the proportion of the monitored objects, identical in the first sub-list and the second sub-list to the monitored objects in the second sub-list, satisfies the defined threshold percentage of matching entries.

13. A non-transitory computer readable medium comprising machine-executable instructions that, when executed by a device, cause the device to perform operations, comprising:

receiving multiple sets of index values collected at multiple time points within a time period, each set of index values of the multiple sets of index values comprising a first number of index values corresponding to a respective monitored object;

selecting a second number of index values from the first number of index values for each set in the multiple sets of index values, the second number being less than the first number, to generate multiple sets of reduced index values for storage; and updating the second number to be used for reduction of subsequent index values, the updating comprising:

generating a first list of monitored objects based on at least a part of the multiple sets of index values;

generating a second list of monitored objects based on at least a part of the multiple sets of reduced index values; and updating the second number based on determining whether a proportion of monitored objects, identical in the first list and the second list to the monitored objects in the second list, satisfies a threshold.

14. The non-transitory computer readable medium of claim 13, wherein the multiple time points are evenly distributed within the time period.

15. The non-transitory computer readable medium of claim 13, wherein selecting the second number of index values from the first number of index values in each set of index values comprises:

ranking the first number of index values to produce ranked index values; and selecting the second number of index values that are ranked top among the ranked index values.

16. The non-transitory computer readable medium of claim 13, wherein the operations further comprise:

in response to the proportion being determined to be lower than the threshold, iterating, at least once until the proportion exceeds the threshold, performing:

updating the second number by incrementing the second number by a defined amount, resulting in an updated second number;

regenerating the multiple sets of reduced index values using the updated second number, resulting in regenerated multiple sets of reduced index values; and redetermining the proportion based on the regenerated multiple sets of reduced index values.

17. The non-transitory computer readable medium of claim 16, wherein the operations further comprise:

determining the updated second number that satisfies the proportion exceeding the threshold as the second number to be used for reduction of subsequent index values.

18. The non-transitory computer readable medium of claim 13, wherein the operations further comprise:

updating the second number respectively for different time intervals in the time period based on corresponding portions of the multiple sets of index values and corresponding portions of the multiple sets of reduced index values to obtain multiple alternative second numbers.

19. The non-transitory computer readable medium of claim 18, wherein the operations further comprise:

updating the second number using an average or a maximum value of the multiple alternative second numbers.

20. The non-transitory computer readable medium of claim 13, wherein updating the second number comprises:
- identifying a first subgroup of monitored objects in the first list that satisfies a predefined number of top ranked objects according to a ranking criterion;
- identifying a second subgroup of monitored objects in the first list that satisfies a predefined number of top ranked objects according to the ranking criterion; and
- updating the second number based on determining whether the proportion of the monitored objects, identical in the first subgroup and the second subgroup to the monitored objects in the second subgroup, satisfies the threshold.

* * * * *